US008571528B1

(12) United States Patent
Channakeshava (10) Patent No.: US 8,571,528 B1
(45) Date of Patent: Oct. 29, 2013

(54) METHOD AND SYSTEM TO AUTOMATICALLY CREATE A CONTACT WITH CONTACT DETAILS CAPTURED DURING VOICE CALLS

(75) Inventor: Girish Mallenahally Channakeshava, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/358,460

(22) Filed: Jan. 25, 2012

(51) Int. Cl.
 *H04M 3/42* (2006.01)
(52) U.S. Cl.
 USPC .................................. 455/414.1; 379/201.01
(58) Field of Classification Search
 USPC ............... 455/412–414.1, 550.1; 379/201.01, 379/88.14; 704/235, 260; 709/206
 See application file for complete search history.

(56) References Cited

U.S. PATENT DOCUMENTS

| 5,995,824 | A  | * | 11/1999 | Whitfield ................... 455/412.1 |
| 6,138,091 | A  | * | 10/2000 | Haataja et al. .............. 704/215 |
| 8,328,089 | B2 | * | 12/2012 | Kirkland et al. ............ 235/380 |
| 2004/0106397 | A1 | * | 6/2004 | Yamagishi et al. ........... 455/417 |
| 2004/0218737 | A1 | * | 11/2004 | Kelly ........................ 379/88.18 |
| 2006/0193448 | A1 | * | 8/2006 | Donoghue et al. ........... 379/67.1 |
| 2006/0234680 | A1 | * | 10/2006 | Doulton ..................... 455/412.1 |
| 2006/0287002 | A1 | * | 12/2006 | Sun .......................... 455/556.1 |
| 2007/0098145 | A1 | * | 5/2007 | Kirkland et al. ........ 379/201.01 |
| 2007/0178934 | A1 | * | 8/2007 | Sun .......................... 455/550.1 |
| 2007/0239837 | A1 | * | 10/2007 | Jablokov et al. ............ 709/206 |
| 2008/0221883 | A1 | * | 9/2008 | Kirkland et al. ............. 704/235 |
| 2009/0299743 | A1 | * | 12/2009 | Rogers ........................ 704/235 |
| 2010/0220844 | A1 | * | 9/2010 | Noldus et al. ............ 379/202.01 |
| 2011/0013756 | A1 | * | 1/2011 | Davies et al. ............... 379/88.14 |
| 2011/0276595 | A1 | * | 11/2011 | Kirkland et al. ............. 707/769 |
| 2012/0166199 | A1 | * | 6/2012 | Jablokov et al. ............. 704/260 |

* cited by examiner

*Primary Examiner* — Jinsong Hu
*Assistant Examiner* — Nathan Taylor
(74) *Attorney, Agent, or Firm* — Osha Liang LLP (57) ABSTRACT

A method for capturing identity information on a voice call, including determining that a phone call is in session on a mobile device, where the voice call is conducted between an identifying user and a target user, receiving an activation input, initiating, in response to the activation input, an audio recording of the target user on the phone call, recording a voice of the target user in the audio recording, receiving a deactivation input, concluding, in response to the deactivation input, the audio recording of the target user on the phone call, storing the audio recording of the target user, converting the audio recording into an audio recording text, parsing the audio recording text to generate the identity information of a third party, creating, for the third party, a contact including the identity information in the mobile device, and storing the contact in the mobile device.

18 Claims, 9 Drawing Sheets

METHOD AND SYSTEM TO AUTOMATICALLY CREATE A CONTACT WITH CONTACT DETAILS CAPTURED DURING VOICE CALLS

BACKGROUND

Mobile devices and teleconferencing systems rely on address books of contacts for quick access to telephone numbers and other identity information of individuals and/or other entities (e.g. corporations). In order to add or modify a contact in an address book of a mobile device or other system, it is often necessary to manually access the contact. This manual process may require multiple steps, such as opening the address book, searching for the contact name, selecting an edit function to modify the contact, selecting the specific identity information (e.g. email) that is to be modified, changing or adding the new information to the contact, and saving the modified contact to the address book. This process may be time consuming.

Sound recording and reproduction is an electrical or mechanical inscription and re-creation of sound waves, such as spoken voice, singing, instrumental music, or sound effects. Voice control is a field that has rapidly developed over the last few decades. For example, it is possible to dictate text to a file (i.e. voice to text) using present day voice translation software. Further, software exists for parsing text in a file in order to identify specific keywords and/or phrases, and the content related to those keywords or phrases.

SUMMARY

In general, in one aspect, the invention relates to a method for capturing identity information on a voice call, including determining that a phone call is in session on a mobile device, where the voice call is conducted between an identifying user and a target user, receiving, using the mobile device, an activation input, initiating, in response to the activation input, an audio recording of the target user on the phone call, recording a voice of the target user in the audio recording, receiving, using the mobile device, a deactivation input, concluding, in response to the deactivation input, the audio recording of the target user on the phone call, storing the audio recording of the target user, converting the audio recording into an audio recording text, parsing the audio recording text to generate the identity information of a third party, creating, for the third party, a contact including the identity information in the mobile device, and storing the contact in the mobile device.

In general, in one aspect, the invention relates to a system for capturing identity information on a voice call, including a processor; and a contact identification application executing on the processor and configured to determine that a phone call is in session on a mobile device, where the voice call is conducted between an identifying user and a target user, receive, using the mobile device, an activation input, initiate, in response to the activation input, an audio recording of the target user on the phone call, record a voice of the target user in the audio recording, receive, using the mobile device, a deactivation input, conclude, in response to the deactivation input, the audio recording of the target user on the phone call, store the audio recording of the target user, convert the audio recording into an audio recording text, parse the audio recording text to generate the identity information of a third party, create, for the third party, a contact including the identity information in the mobile device, and store the contact in the mobile device.

In general, in one aspect, the invention relates to a non-transitory computer readable storage medium storing instructions for capturing identity information on a voice call, the instructions executable on a processor and including functionality for determining that a phone call is in session on a mobile device, where the voice call is conducted between an identifying user and a target user, receiving, using the mobile device, an activation input, initiating, in response to the activation input, an audio recording of the target user on the phone call, recording a voice of the target user in the audio recording, receiving, using the mobile device, a deactivation input, concluding, in response to the deactivation input, the audio recording of the target user on the phone call, storing the audio recording of the target user, converting the audio recording into an audio recording text, parsing the audio recording text to generate the identity information of a third party, creating, for the third party, a contact including the identity information in the mobile device, and storing the contact in the mobile device.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for capturing identity information of a third party on a voice call. Specifically, in one or more embodiments of the invention, it is determined that a voice call is in session, an activation input is provided by an identifying user, an audio recording is initiated, a target user's voice is recorded, a deactivation input is received, the audio recording of the target user is stopped, the audio recording is stored and converted into an audio recording text, the audio recording text is parsed to create identity information, and a contact is created using the identity information. Those skilled in the art will appreciate that there may be various other embodiments of the invention.

Figure 1A:
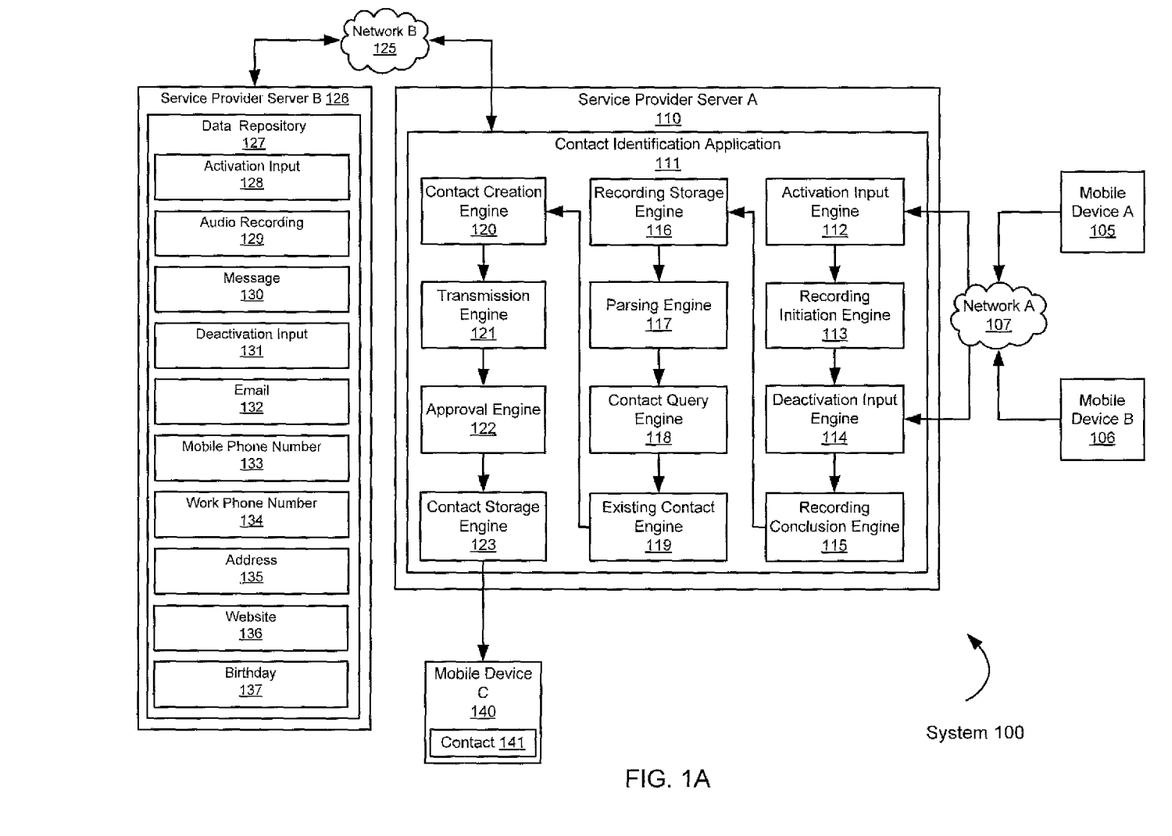
FIGS. 1A and 1B show a system in accordance with one or more embodiments of the invention.

FIG. 1A shows a system (100) in accordance with one or more embodiments of the invention. As shown in FIG. 1A, the system (100) includes components such as a contact identification application (111) and a data repository (127). The contact identification application (111) may include components such as an activation input engine (112), a recording initiation engine (113), a deactivation input engine (114), a recording conclusion engine (115), a recording storage engine (116), a parsing engine (117), a contact query engine (118), an existing contact engine (119), a contact creation engine (120), a transmission engine (121), an approval engine (122), and a contact storage engine (123). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet, a wide area network (WAN), or a local area network (LAN)), with wired and/or wireless segments. In one or more embodiments of the invention, there may be more than one activation input engine, recording initiation engine, deactivation input engine, recording conclusion engine, recording storage engine, parsing engine, contact query engine, existing contact engine, contact creation engine, transmission engine, approval engine, and contact storage engine running on a device, as well as more than one mobile device interfacing with those components. Alternatively, those skilled in the art will appreciate that some or all of the aforementioned components of the contact identification application may be combined into one or more engines with more robust functionality. For example, a single recording engine may perform the functions of each of the engines 112-115.

In one or more embodiments of the invention, a mobile device A (105) and a mobile device B (106) are operated by users in a voice call. Mobile devices (105, 106) may be any wireless phone capable of making a voice call. The mobile devices A (105) and B (106) may perform the voice call over a wireless network (not shown), and may transmit data to a service provider server A (110) via a network A (107). Network A (107) may be any wireless network. While the users of the mobile devices A (105) and B (106) are engaged in a conversation, they may wish to transfer identity information of a third party over the voice call without disrupting the voice call. The voice call may be a phone call between two or more mobile devices, a voice over internet protocol (VOIP) call, a video conferencing call, or any other type of call that allows two or more users to communicate with each other using voice. For example, a user of the mobile device A (105) (e.g. "user A") may wish to create a contact in the mobile device A (105) containing information of a target user (e.g. a third party that is not on the phone, or the user of the mobile device B (106)). The user of the mobile device B (106) (e.g. "user B") may provide this information to user A, and the information may be processed by a contact identification application (111).

In one or more embodiments of the invention, a service provider server A (110) is configured to host the contact identification application (111). The contact identification application (111) is a software application that includes several engines configured to perform specific functions to capture identity information of a third party on a voice call. Specifically, engines operating as part of the contact identification application (111) may include functionality to determine that a phone call is in session on a mobile device, receive an activation input, initiate an audio recording of the target user on the phone call, record a voice of the target user in the audio recording, receive a deactivation input, conclude the audio recording of the target user on the phone call, store the audio recording of the target user, convert the audio recording into an audio recording text, parse the audio recording text to generate the identity information, create a contact including the identity information in the mobile device, store the contact in the mobile device, and perform other calculations associated with capturing identity information of a third party on a voice call.

The contact identification application (111) may receive input from various sources, including mobile device A (105) and mobile device B (106). The contact identification application (111) may store data in and/or access data from a data repository (127). The service provider server A (110), contact identification application (111), and other data stored on the service provider server A (110) may be owned and/or operated by a service provider (e.g. the owner, developer, and/or manager of the contact identification application (111)). Each engine of the contact identification application (111) is described below. Those skilled in the art will appreciate that each of the engines described may have other functionality beyond that disclosed, and that the functionality of each engine may alternatively be performed by any of the other engines.

In one or more embodiments of the invention, an activation input engine (112) is configured to receive an activation input. An activation input is any signal provided by a user on voice call that indicates that a voice recording should begin. In other words, the activation input serves as a trigger to begin voice recording. For example, the activation input may be a predetermined key on a keypad of the mobile device A (105). The activation input may also be a keyword that is spoken by a user and is recognized by the system (100) as a command to begin the recording. The activation input may be provided by any party on a voice call (e.g. an identifying user, a target user, or another user). After receiving the activation input, the activation input engine (112) may process (i.e. modify, transform, format) the activation input, and then pass control of the system (100) to any engine. Those skilled in the art will appreciate that the activation input engine (112) may receive an activation input from other entities beyond the users on a voice call, and may perform other functions beyond those disclosed.

In one or more embodiments of the invention, a recording initiation engine (113) is configured to initiate an audio recording of a target user on the voice call, and record the voice of the target user in the audio recording. A target user is a participant of the voice call whose voice is to be recorded. While recording the voice of the target user, the recording initiation engine (113) may process (i.e. modify, transform, format) the voice, and then pass control of the system (100) to any engine. Those skilled in the art will appreciate that the recording initiation engine (113) may record the voice of other entities beyond the target user, and may perform other functions beyond those disclosed.

In one or more embodiments of the invention, a deactivation input engine (114) is configured to receive a deactivation input. A deactivation input is any signal/trigger provided by a user on voice call that indicates that the recording should end. For example, the deactivation input may be a predetermined key on a keypad of the mobile device B (106). The deactivation input may also be a keyword that is spoken by a user and is recognized by the system (100) as a command to end the recording. The deactivation input may be provided by any party on a voice call (e.g. an identifying user, a target user, or another user). For example, the deactivation input may be provided by the same user who provided the activation input. Moreover, the deactivation input may be, in one embodiment, the same key on the mobile phone as the activation input key. In this case, a single key when pressed once would trigger a voice recording to begin, and when pressed twice, would trigger the voice recording to end. After receiving the deactivation input, the deactivation input engine (114) may process (i.e. modify, transform, format) the deactivation input, and pass control of the system (100) to any engine. Those skilled in the art will appreciate that the deactivation input engine (114) may receive the deactivation input from entities beyond participants on the voice call, and may perform other functions beyond those disclosed.

In one or more embodiments of the invention, a recording conclusion engine (115) is configured to conclude the audio recording of the target user on the voice call. The recording conclusion engine (115) may conclude the audio recording based on a trigger received from the deactivation input engine (114). After concluding the audio recording, the recording conclusion engine (115) may pass control of the system (100) to any other engine. Those skilled in the art will appreciate that the recording conclusion engine (115) may perform other functions beyond those disclosed, and that the functions performed by engines (112)-(115) may also be performed by a single engine.

In one or more embodiments of the invention, a recording storage engine (116) is configured to store the audio recording of the target user. The audio recording may be stored on any storage device, in any known storage format. The storage may be located on the service provider server A (110), the service provider server B (126), or another location that is remotely accessible by service provider server A (110). The recording storage engine (116) may receive the audio recording from the recording conclusion engine (115). After receiving the audio recording, the recording storage engine (116) may process (i.e. modify, transform, format) the audio recording, and then pass control of the system (100) to the next engine. The recording storage engine (116) may include memory for storing the recording, or alternatively, may include functionality to find available memory for storing the recording on the server or device where the recording is to be stored. Those skilled in the art will appreciate that the recording storage engine (116) may receive the audio recording from other entities beyond the recording conclusion engine (115), and may perform other functions beyond those disclosed.

In one or more embodiments of the invention, a parsing engine (117) is configured to convert the audio recording into an audio recording text and parse the audio recording text to generate the identity information of a third party. Those skilled in the art will appreciate that conversation of the voice audio to text may be performed using algorithms well-known in the art, such as Hidden Markov models (HMMs) and Dynamic time warping (DTW) speed-to-text algorithms. The audio recording text is a text file that contains a transcript of the audio recording. The process of parsing the audio recording text entails analyzing the text file to identify keywords/phrases and/or data associated with or indicating identity information. For example, such keywords/phrases may be spoken phrases such as "My name is" and "e-mail address" or proper nouns/words which are not defined in a dictionary. The identity information may include any data that relates to the identity of an individual or entity (company, corporation, etc.), such as a name, an email address, a mobile phone number, a work phone number, a work address, a home address, a website, a birthday, a nickname, a job title, a department, a social network handle, a social network profile, an instant message name, notes relating to the individual, any combination thereof, etc.

In one or more embodiments, the parsing engine (117) may receive the audio recording from the recording storage engine (116). After converting the voice in the audio recording to text and parsing the text to generating the identity information, the parsing engine (117) may process (i.e. modify, transform, format) the identity information, and then transmit the identity information to the contact query engine (118) for further processing. In parallel, the parsing engine (117) may pass control of the system (100) to any other engine. Those skilled in the art will appreciate that the parsing engine (117) may receive the audio recording from other entities beyond the recording storage engine (116), and may perform other functions beyond those disclosed.

In one or more embodiments of the invention, a contact query engine (118) is configured to determine if a contact already exists for the third party. A contact may be a profile associated with an individual in a mobile device. After determining if a contact already exists for the third party, the contact query engine (118) may pass control of the system (100) to the existing contact engine (119) or the contact creation engine (120). Those skilled in the art will appreciate that the contact query engine (118) may perform other functions beyond those disclosed.

In one or more embodiments of the invention, an existing contact engine (119) is configured to add the identity information to the existing contact of the third party. The existing contact may be located in, for example, a mobile device. After adding the identity information to the existing contact, the existing contact engine (119) may process (i.e. modify, transform, format) the existing contact, and then pass control of the system (100) to any other engine. Those skilled in the art will appreciate that the existing contact engine (119) may perform other functions beyond those disclosed.

In one or more embodiments of the invention, a contact creation engine (120) is configured to create a contact of the third party. The contact creation engine (120) may receive control from the contact query engine (118). After creating a contact of the third party, the contact creation engine (120) may pass control of the system (100) to any other engine. Those skilled in the art will appreciate that the contact creation engine (120) may perform other functions beyond those disclosed.

In one or more embodiments of the invention, a transmission engine (121) is configured to transmit the contact. The transmission of the contact (141) may be to another mobile device (e.g. mobile device C (140)), in the form of text, MMS, e-mail, etc. The transmission engine (121) may receive the contact from the contact creation engine (120) or the existing contact engine (119). After transmitting the contact, the transmission engine (121) may pass control of the system (100) to any other engine. Those skilled in the art will appreciate that the transmission engine (121) may perform other functions beyond those disclosed.

In one or more embodiments of the invention, an approval engine (122) is configured to receive an approval of the contact. The approval may be generated based on the action of a user of a mobile device. The approval engine (122) may receive the approval from a mobile device. After receiving the approval, the approval engine (122) may process (i.e. modify, transform, format) the approval, and then pass control of the system (100) to any other engine. Those skilled in the art will appreciate that the approval engine (122) may receive an approval from other entities beyond a user of a mobile device, and may perform other functions beyond those disclosed. Further, the functions performed by the approval engine (122) may also be performed by the existing contact engine (119) and/or the contact creation engine (120).

In one or more embodiments of the invention, a contact storage engine (123) is configured to store the contact. The contact may be stored in any suitable location, such as a mobile device (e.g. contact (141) on mobile device C (140)). Those skilled in the art will appreciate that the mobile device C (140) may be the same device as the mobile device A (105). The contact storage engine (123) may be a part of an existing application for managing contacts on the mobile device. The contact storage engine (123) may receive the contact from the approval engine (122). After storing the contact, the contact storage engine (123) may pass control of the system (100) to any other engine. Those skilled in the art will appreciate that the contact storage engine (123) may receive the contact from other entities beyond the approval engine (122), and may perform other functions beyond those disclosed.

In one or more embodiments of the invention, a service provider server 13 (126) is configured to host a data repository (127). The data repository (127) may contain data associated with the contact identification application (111). The data repository (127) may be a relational database that stores data entries associated with the contact identification application (111). The data repository (127) may also be a spreadsheet containing data cells associated with the contact identification application (111). In one or more embodiments of the invention, the data repository (127) may be implemented with many technologies. The data repository (127) may receive data from various sources, including the contact identification application (111), and any of the engines of the contact identification application (111), over a network B (125). Network B (125) may be any wireless network, such as the Internet.

After receiving data from the contact identification application (111), the data repository (127) may process (i.e. modify, transform, format) the data, and then store the data. The data may include elements including an activation input (128), an audio recording (129), a message (130) (e.g. an SMS), a deactivation input (131), an email (132), a mobile phone number (133), a work phone number (134), an address (135), a website (136), and a birthday (137). Those skilled in the art will appreciate that the data repository (127) may receive and store data from other entities beyond the contact identification application (111), and may perform other functions beyond those disclosed. Further, the service provider server B (126), and the data stored on this server may be owned and/or operated by a service provider (e.g. the owner, developer, and/or manager of the contact identification application (111)).

Figure 1B:
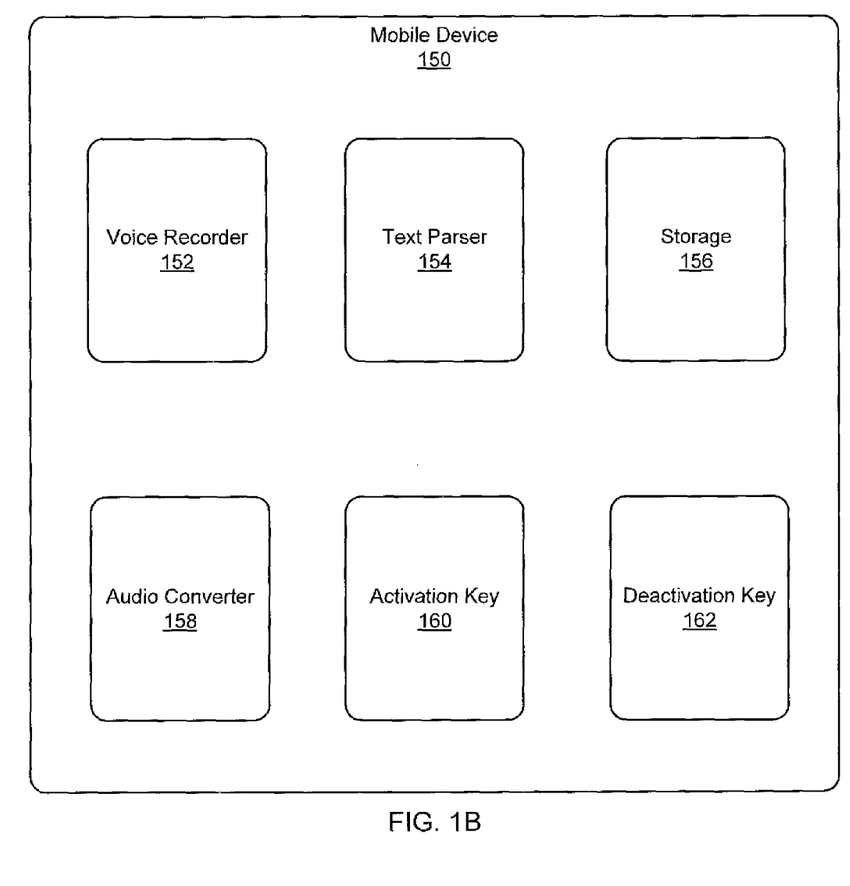

FIG. 1B shows a mobile device in accordance with one or more embodiments of the invention. The mobile device shown in FIG. 1B may be used, for example, with the system (100), to capture identity information of a third party on a voice call. As described above, in FIG. 1A, data captured during the voice call between mobile device A (105) and mobile device B (106) is transferred and processed on service provider server A (110). However, in one or more embodiments of the invention, the processing of the audio voice recording may be performed on one of the mobile devices involved in the voice call. This is the scenario shown in the mobile device (150) of FIG. 1B. The elements shown in FIG. 1B may differ among embodiments of the invention, and one or more of the elements may be optional. Accordingly, the scope of the invention should not be considered limited to the specific elements shown in FIG. 1B.

In FIG. 1B, a mobile device (150) contains various components, including a voice recorder (152), a text parser (154), a storage (156), an audio converter (158), an activation key (160), and a deactivation key (162). The voice recorder (152) may be a hardware and/or software component that records an audio stream between the mobile device (150) and one or more other mobile devices. Specifically, the voice recorder (152) may be triggered by the activation key (160) and the deactivation key (162). In one or more embodiments of the invention, the voice recorder (152) may also be configured to be triggered by activation and/or deactivation keys on another mobile device (not shown) participating in a voice call with the mobile device (150).

The text parser (154) may be a hardware and/or software component that parses a text file containing natural language text. The storage (156) may be a hardware component (e.g. memory) that stores data on the mobile device (150). The audio converter (158) may be a hardware and/or software component that coverts an audio stream or file containing a voice recording to a text file. The audio converter (158) may use speech-to-text algorithms known in the art to perform its functions. The activation key (160) may be a hardware and/or software component that triggers an activation event. The deactivation key (162) may be a hardware and/or software component that triggers a deactivation event. The activation key (160) and deactivation key (162) may be the same key or distinct keys on the mobile device. The activation key (160) and deactivation key (162) may also be virtual keys on a virtual keypad or physical keys on a physical keypad. Together, the components of the mobile device (150) shown in FIG. 1B may be used to begin a voice recording, end a voice recording, convert the voice recording stored on the mobile phone to text, parse the text to obtain identity information, and store the identity information in a contact application (not shown) on the mobile phone (150). Those skilled in the art will appreciate that the mobile device (150) may contain other components that have not been described, and that each component may perform other functions than those disclosed.

Figure 2:
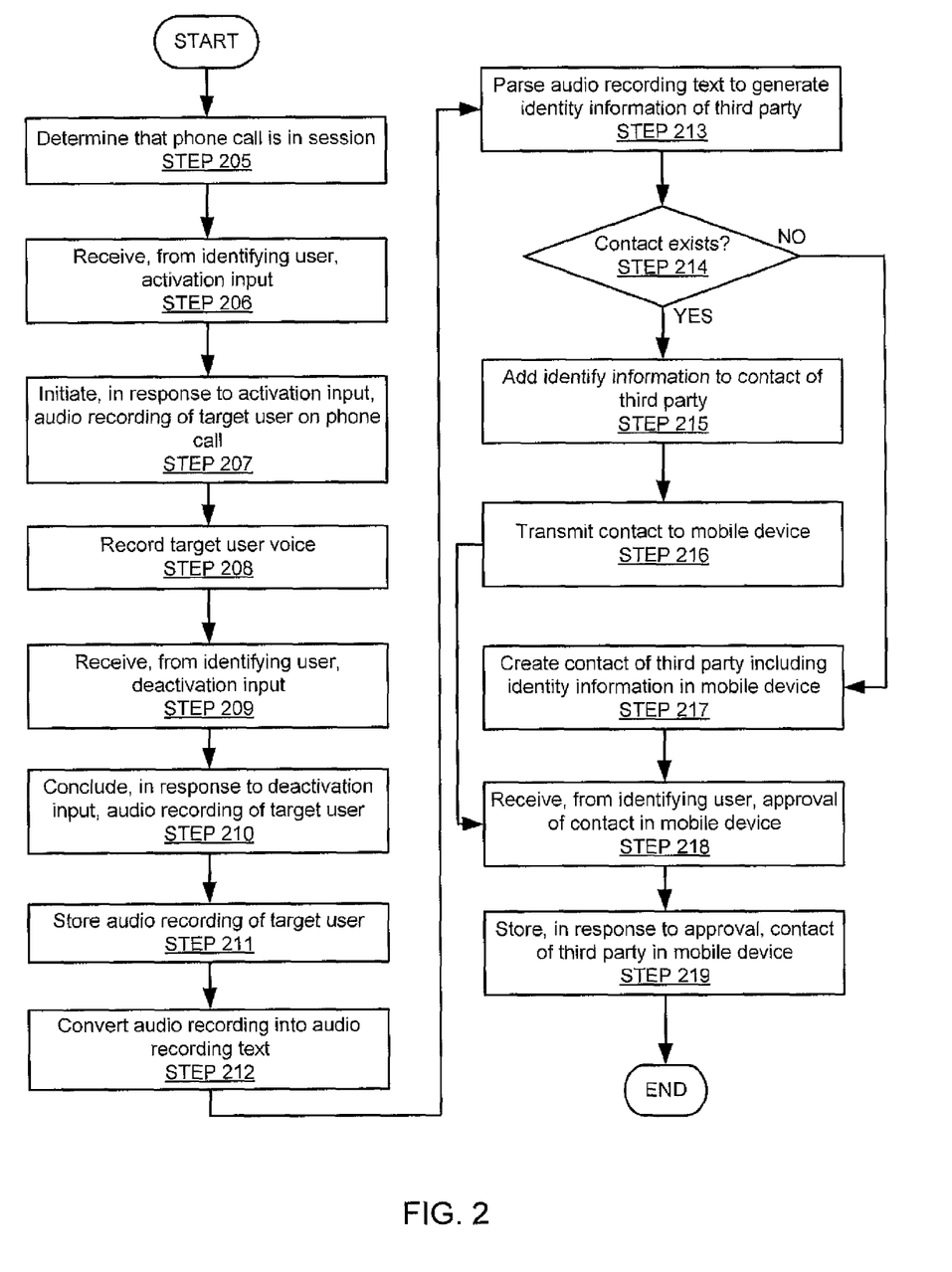
FIG. 2 shows a flowchart in accordance with one or more embodiments of the invention.

FIG. 2 shows a flowchart in accordance with one or more embodiments of the invention. The process shown in FIG. 2 may be used, for example, with the system (100) or may be implemented on mobile phone (150), to capture identity information of a third party on a voice call. The sequence of steps shown in FIG. 2 may differ among embodiments of the invention, and one or more of the steps may be performed in parallel and/or may be optional. Accordingly, the scope of the invention should not be considered limited to the specific arrangement of steps shown in FIG. 2.

In STEP 205, it is determined that a phone call is in session. The phone call may be in session between two or more users. The users may include an identifying user and a target user. The identifying user is the participant of the phone call that obtains the identity information of a third party. The target user is a participant of the phone call that provides the identity information of the third party to the identifying user.

In STEP 206, an activation input is received from an identifying user. The activation input may, for example, be received when the identifying user presses a key on the keypad of a mobile device (e.g. the "#" symbol). The activation input may also be received when the identifying user says a keyword or keywords into a mobile device (e.g. "activate"). The keyword may also be associated with a password (e.g. "activate 12345"). Further, the activation input may also be received from any other user participating in the phone call (e.g. the target user).

In STEP 207, an audio recording of a target user on the phone call is initiated. The initiation of the audio recording may be triggered by the receipt of the activation input. The audio recording may be performed by hardware and/or software on a mobile device or a remote server.

In STEP 208, the recording of the target user's voice is triggered in response to the activation input and the target user's voice is recorded. Everything that the target user says may be recorded from the point that the audio recording is initiated. In other words, the conversation between all parties on the phone call is recorded from that point forward.

In STEP 209, a deactivation input is received from the identifying user. The deactivation input may, for example, be received when the identifying user presses a key on the keypad of a mobile device (e.g. the "#" symbol). The deactivation input may also be received when the identifying user says a keyword or keywords into a mobile device (e.g. "deactivate"). The keyword may also be associated with a password (e.g. "deactivate 12345"). Further, the deactivation input may also be received from any other user participating in the phone call (e.g. the target user).

In STEP 210, the audio recording of the target user is concluded/stopped. The conclusion of the audio recording may be triggered by the receipt of the deactivation input. Further, the conclusion of the audio recording may trigger the storage of the audio recording. In STEP 211, the audio recording is stored. The audio recording may be stored in a remote server, on a mobile device, or in another location. Those skilled in the art will appreciate that there may be various storage locations for the audio recording.

In STEP 212, the audio recording is converted into audio recording text. In other words, the speech in the audio recording may be translated into text form. The audio recording text may include metadata, such as author, timestamps for each portion of the text, and so forth. Those skilled in the art will appreciate that various types of processing of the speech in the audio recording may occur. For example, the audio recording may be translated directly from the language spoken in the recording into another language in the text format (e.g. Italian to English).

In STEP 213, the audio recording text is parsed to generate identity information of a third party that may or may not be a participating entity in the phone call. For example, the audio recording may generate the following identity information—"Name: Thomas Smith, Email: thomas.smith@gmail.com, Mobile Phone Number: 510.123.4567". The identity information may be parsed from natural language data. In other words, the identity information may be generated from the following sentences in the audio recording text—"Here is Thomas Smith's information. Thomas' email is thomas dot smith at gmail dot corn, and his cell phone is 5101234567". Those skilled in the art will appreciate that there may be various processing performed on the audio recording text to extract and generate the identity information.

In STEP 214, it is determined if a contact for the third party with whom the identity information is associated exists. The contact may exist in the mobile device of the identifying user, or in a list of contacts accessed on a remote server. If the contact exists, then the process proceeds to STEP 215, otherwise the process proceeds to STEP 217.

In STEP 215, the new identity information obtained during the phone call is added to the existing contact of the third party. The existing contact of the third party may have some information, to which the identity information is added. For example, an existing contact for Thomas Smith may have had a work number, but not his email of mobile phone number. After the identity information is added to Thomas Smith's contact, it will have his work number, mobile phone number, and email.

In STEP 216, the contact is transmitted to a mobile device. This would occur if, for example, the contact existed on a remote server and then needed to be imported into the identifying user's mobile phone. In this case, the contact may be transmitted from the server on which it was stored and updated, to the identifying user's mobile phone. The contact may also be transmitted from a mobile phone to a computer system that stores data for the mobile device and communicates with the mobile device over a network.

In STEP 217, a contact of the third party is created. The contact may contain all of the identity information (e.g. name, mobile phone number, email), as well as other information obtained by performing a search in the system for related information. For example, a search for "Thomas Smith" may result in his work number, which may also be included in the contact.

In STEP 218, an approval of the contact in the mobile device is received from the identifying user. The approval may be received, for instance, after the identifying user reviews the contact and indicates that it contains the correct data with the approval.

In STEP 219, the contact is stored in the mobile device. The contact may be stored in, for example, a local memory of the mobile device such as a SIM card. The contact may also be stored on a remote server that that mobile device accesses over a network.

Those skilled in the art will appreciate that the process described above may also use a message for the transmission of identity information between parties. The message may be any type of message, such as a Short Message Service (SMS) message, an e-mail message, or a Multimedia Messaging Service (MMS) message. The message may include contact information about a third party. For example, while a phone call is in session, a target user may transmit to an identifying user an MMS containing the following text —"Here is Thomas Smith's information. Thomas' address is 1234 Ocean Boulevard, Santa Monica, Calif., 90401". The text in this message may be parsed and used to generate identity information, such as "Name: Thomas Smith, Home Address: 1234 Ocean Boulevard, Santa Monica, Calif., 90401". In this case, Step 213 may involve parsing the SMS, MMS, or e-mail message to identify identity information. In other words, some of or all of Steps 200-219 may be repeated in slightly modified form to accommodate capturing identity information from a message that may be transmitted between parties of a phone call while the phone call is in session (i.e. during the phone call).

Once an activation input is received, any of the users on a voice call (e.g. the target user) may enter identity information into a mobile device by pressing one or more keys on the dial pad of the mobile device. When a user presses a key, a corresponding dual tone multi frequency (DTMF) tone is generated for that key, which may then be decoded to determine the key that was pressed. A DTMF is a signal that is sent to a service provider (e.g. a telecommunications company) as a means of identifying which keys are pressed on a dial pad of a phone. Interactive voice response (IVR) is a technology that allows a computer system to interact with a user through the use of voice and DTMF keypad inputs. DTMF signals may be used with IVR to capture credit card information over a phone. In one or more embodiments of the invention, contact details (i.e. identity information) may be captured using IVR and DTMF signals. Those skilled in the art will appreciate that there may be various other means by which users can transmit identity information to other users on a voice call.

Those skilled in the art will appreciate that there may be various other mechanisms by which a user may transfer identity information to another user over a phone call that have not been described. There may also be various failsafe mechanisms. For example, if the phone call is disconnected, the audio recording of the target user may be stored, without receiving the deactivation input, for later processing.

Figure 3:
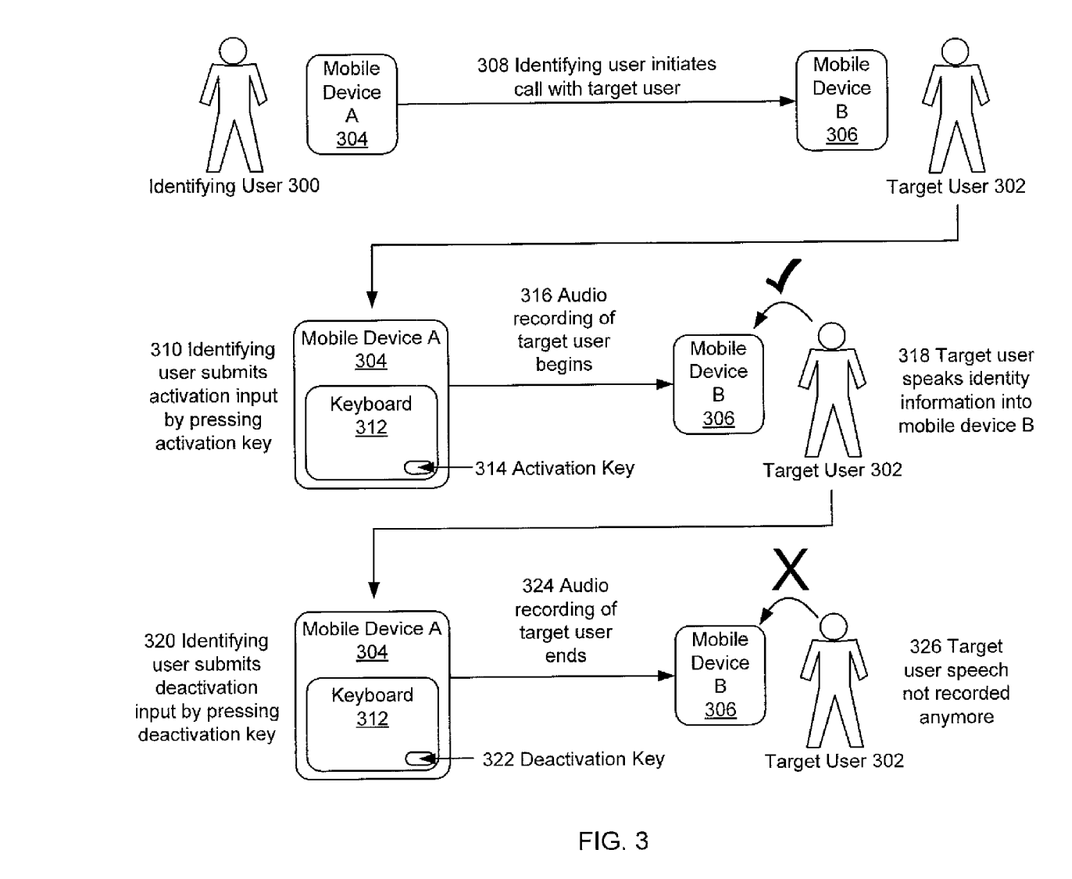
FIGS. 3-7 show examples in accordance with one or more embodiments of the invention.

FIG. 3 shows an example in accordance with one or more embodiments of the invention. The example shown in FIG. 3 may be used, for example, with the system (100), to capture identity information of a third party on a voice call. The sequence of steps shown in FIG. 3 may differ among embodiments of the invention, and one or more of the steps may be performed in parallel and/or may be optional. Accordingly, the scope of the invention should not be considered limited to the specific arrangement of steps shown in FIG. 3.

In FIG. 3, an identifying user (300) initiates a phone call (308) with a target user (302). The phone call occurs between a mobile device A (304) of the identifying user (300) and a mobile device B (306) of the target user (302). When the identifying user (300) is ready to begin an audio recording of the target user (302), the identifying user (300) submits an activation input (310) by pressing an activation key (314). The activation key (314) is on the keyboard (312) of the mobile device A (304). The activation input begins an audio recording (316) of the target user (302) and/or the conversation between the identifying user (300) and the target user (302).

Once the audio recording begins, everything the target user (302) says in the phone call is recorded. A portion or all of what the target user (302) speaks into mobile device B (306) may be identity information (318). In other words, if the target user (302) says "Ok, I'll tell you Thomas Smith's info. His mobile is 510.123.4567, and his email is thomas.smith@gmail.com," the identity information may include the name of the third party (i.e. "Thomas Smith"), the mobile phone number of the third party (i.e. "510.123.4567"), and the email address of the third party (i.e. "thomas.smith@gmail.com"). Those skilled in the art will appreciate that there may also be other users on the phone call beyond the identifying user (300) and the target user (302) whose voices may be recorded.

When the identifying user (300) determines that enough audio has been recorded, the identifying user (300) may submit a deactivation input (320) by pressing a deactivation key (322). The deactivation key (322) is on the keyboard (312) of the mobile device A (304). When the deactivation input is received, the audio recording of the target user (302) and/or the conversation between the identifying user (300) and the target user (302) ends (324). After the audio recording ends, the speech of the target user (302) is not recorded anymore (326). Those skilled in the art will appreciate that there may be various other ways by which identity information of a third party is obtained.

Figure 4:
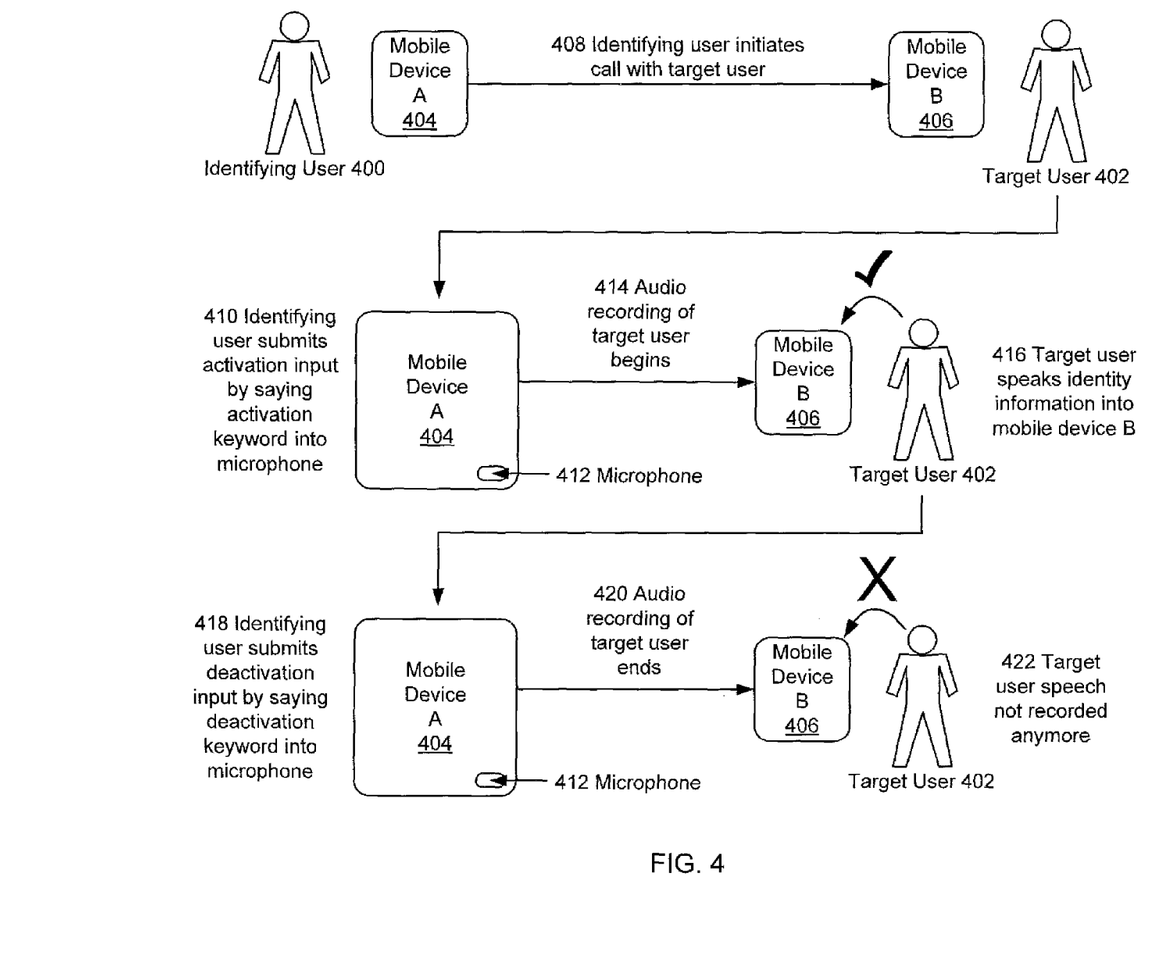

FIG. 4 shows an example in accordance with one or more embodiments of the invention. The example shown in FIG. 4 may be used, for example, with the system (100), to capture identity information of a third party on a voice call. The sequence of steps shown in FIG. 4 may differ among embodiments of the invention, and one or more of the steps may be performed in parallel and/or may be optional. Accordingly, the scope of the invention should not be considered limited to the specific arrangement of steps shown in FIG. 4.

In FIG. 4, an identifying user (400) initiates a phone call (408) with a target user (402). The phone call occurs between a mobile device A (404) of the identifying user (400) and a mobile device B (406) of the target user (402). When the identifying user (400) is ready to begin an audio recording of the target user (402), the identifying user (400) submits an activation input (410) by saying an activation keyword into a microphone (412). The activation keyword may be, for instance, "activate." The microphone (412) is part of the mobile device A (404). The activation input begins an audio recording (414) of the target user (402) and/or the conversation between the identifying user (400) and the target user (402).

Once the audio recording begins, everything the target user (402) says in the phone call is recorded. A portion or all of what the target user (402) speaks into mobile device B (406) may be identity information (416). Those skilled in the art will appreciate that there may also be other users on the phone call beyond the identifying user (400) and the target user (402) whose voices may be recorded.

When the identifying user (400) determines that enough audio has been recorded, the identifying user (400) may submit a deactivation input (418) by saying a deactivation keyword into the microphone (412). The deactivation keyword may be, for instance, "deactivate." When the deactivation input is received, the audio recording of the target user (402) and/or the conversation between the identifying user (400) and the target user (402) ends (420). After the audio recording ends, the speech of the target user (402) is not recorded anymore (422). Those skilled in the art will appreciate that there may be various other ways by which identity information of a third party is obtained.

Figure 5:
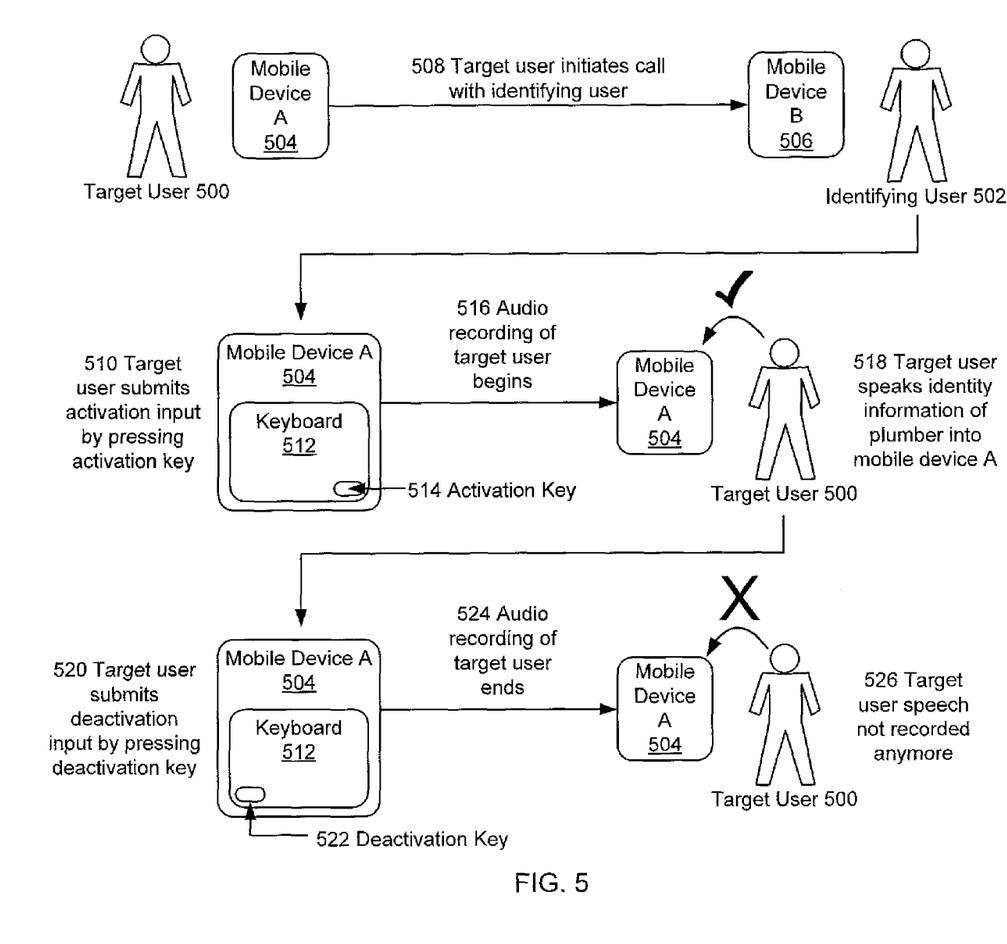

FIG. 5 shows an example in accordance with one or more embodiments of the invention. The example shown in FIG. 5 may be used, for example, with the system (100), to capture identity information of a third party on a voice call. The sequence of steps shown in FIG. 5 may differ among embodiments of the invention, and one or more of the steps may be performed in parallel and/or may be optional. Accordingly, the scope of the invention should not be considered limited to the specific arrangement of steps shown in FIG. 5.

In FIG. 5, a target user (500) initiates a phone call (508) with an identifying user (502). The phone call occurs between a mobile device A (504) of the target user (500) and a mobile device B (506) of the identifying user (502). When the target user (500) is ready to begin an audio recording of him, the target user (500) submits an activation input (510) by pressing an activation key (514). The activation key (514) may be, for instance, "#," and is on a keyboard (512) of the mobile device A (504). The activation input begins an audio recording (516) of the target user (500) and/or the conversation between the identifying user (502) and the target user (500).

Once the audio recording begins, everything the target user (500) says in the phone call is recorded. A portion or all of what the target user (500) speaks into mobile device A (504) may be identity information (518). In this example, the identity information (518) relates to a third party (i.e. plumber). In other words, the third party to whom the identity information (518) refers is not a party participating in the phone call. In this manner, the target user (500) and the identifying user (502) may record identity information of any third party, which may then be stored in the contacts of either the target user (500) or the identifying user (502), depending on which user requests the third party identity information. Those skilled in the art will appreciate that there may also be other users on the phone call beyond the identifying user (502) and the target user (500) whose voices may be recorded.

When the target user (500) determines that enough audio has been recorded, the target user (500) may submit a deactivation input (520) by pressing a key (522) on the keyboard (512) of the mobile device A (504). The deactivation key (522) may be distinct from the activation key (514), and may be, for instance, "*". Those skilled in the art will appreciate that the deactivation key (522) may also be the same key as the activation key (514). When the deactivation input is received, the audio recording of the target user (500) and/or the conversation between the identifying user (502) and the target user (500) ends (524). After the audio recording ends, the speech of the target user (500) is not recorded anymore (526). Those skilled in the art will appreciate that there may be various other ways by which identity information of a third party is obtained using embodiments of the invention. For example, in one embodiment of the invention, a portion of the identity information (518) may be obtained by parsing the recording of the voice of the target user (500), and a remaining part of the identity information (518) may be obtained by parsing a text message sent by any one of the target user (500) or the identifying user (502) while the two parties are still engaged in the phone call. That is, in one or more embodiments of the invention, a first portion of the identity information of a third party may be captured via voice recording, while a second portion of the identity information of the third party may be transmitted via SMS, text, or e-mail among the parties of the phone call, while the phone call is still in session.

Figure 6:
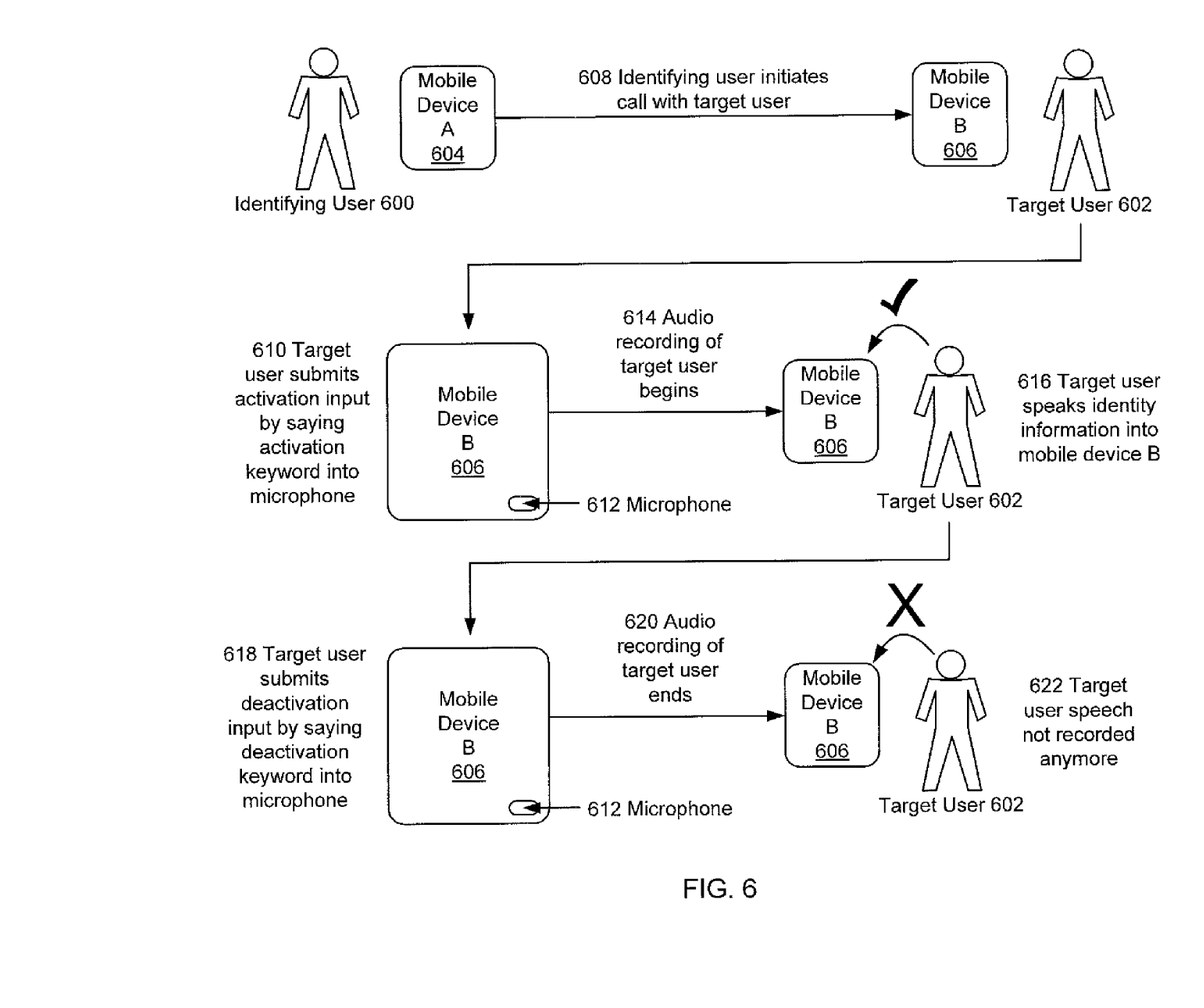

FIG. 6 shows an example in accordance with one or more embodiments of the invention. The example shown in FIG. 6 may be used, for example, with the system (100), to capture identity information of a third party on a voice call. The sequence of steps shown in FIG. 6 may differ among embodiments of the invention, and one or more of the steps may be performed in parallel and/or may be optional. Accordingly, the scope of the invention should not be considered limited to the specific arrangement of steps shown in FIG. 6.

In FIG. 6, an identifying user (600) initiates a phone call (608) with a target user (602). The phone call occurs between a mobile device A (604) of the identifying user (600) and a mobile device B (606) of the target user (602). When the identifying user (600) and/or the target user (602) is ready to begin an audio recording of the target user (602), the target user (602) submits an activation input (610) by saying an activation keyword into a microphone (612) of the mobile device B (606). The activation keyword may be, for instance, "activate." The activation input begins an audio recording (614) of the target user (602) and/or the conversation between the identifying user (600) and the target user (602).

Once the audio recording begins, everything the target user (602) says in the phone call is recorded. A portion or all of what the target user (602) speaks into mobile device B (606) may be identity information (616). Those skilled in the art will appreciate that there may also be other users on the phone call beyond the identifying user (600) and the target user (602) whose voices may be recorded.

When the identifying user (600) and/or the target user (602) determines that enough audio has been recorded, the target user (602) may submit a deactivation input (520) by saying a deactivation keyword into the microphone (612) of the mobile device B (606). The deactivation keyword may be distinct from the activation keyword, and may be, for instance, "deactivate." Those skilled in the art will appreciate that the deactivation keyword may also be the same as the activation keyword. When the deactivation input is received, the audio recording of the target user (602) and/or the conversation between the identifying user (600) and the target user (602) ends (620). After the audio recording ends, the speech of the target user (602) is not recorded anymore (622). Those skilled in the art will appreciate that there may be various other ways by which identity information of a third party is obtained.

Figure 7:
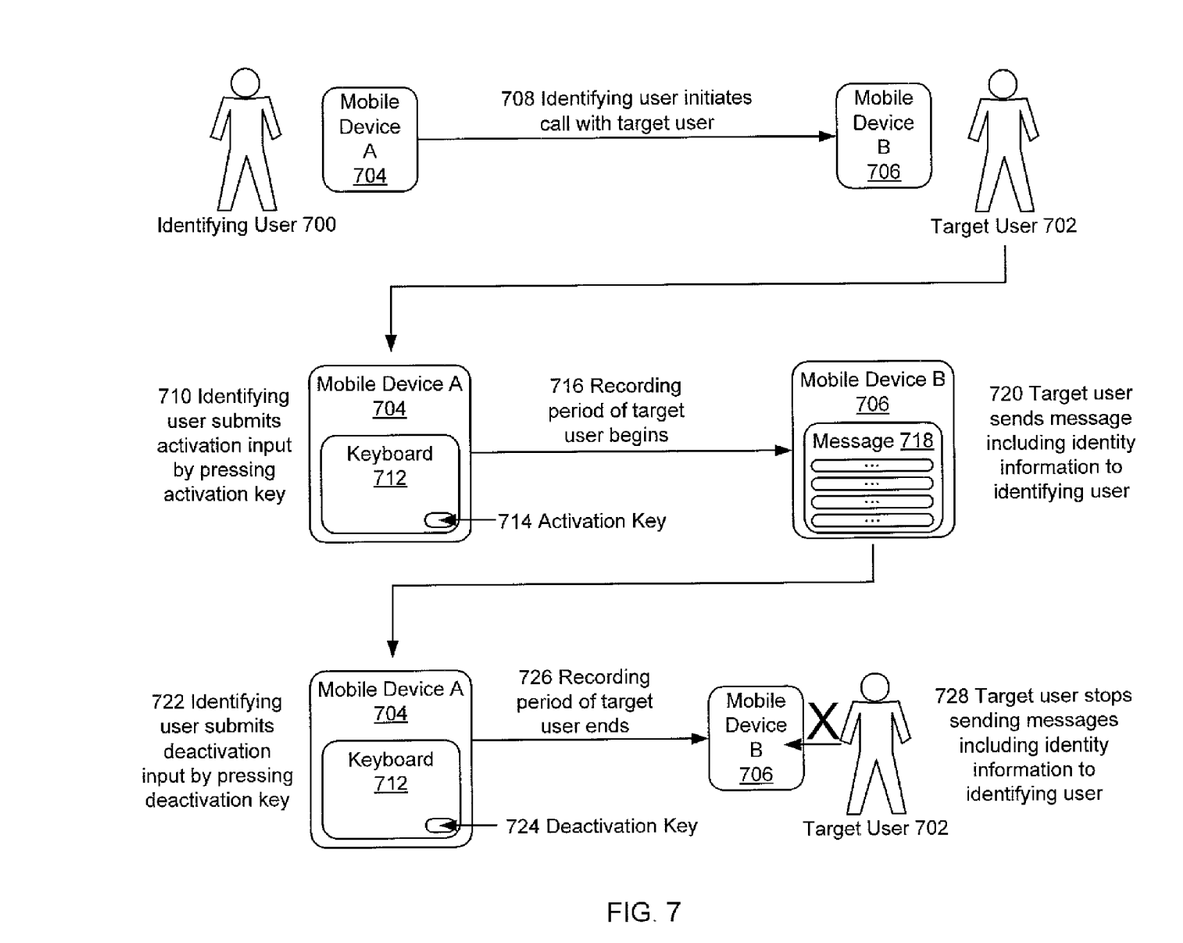

FIG. 7 shows an example in accordance with one or more embodiments of the invention. The example shown in FIG. 7 may be used, for example, with the system (100), to capture identity information of a third party on a voice call. The sequence of steps shown in FIG. 7 may differ among embodiments of the invention, and one or more of the steps may be performed in parallel and/or may be optional. Accordingly, the scope of the invention should not be considered limited to the specific arrangement of steps shown in FIG. 7.

In FIG. 7, an identifying user (700) initiates a phone call (708) with a target user (702). The phone call occurs between a mobile device A (704) of the identifying user (700) and a mobile device B (706) of the target user (702). When the identifying user (700) and/or the target user (702) is ready to begin a recording period relating to the target user (702), the identifying user (700) submits an activation input (710) by pressing an activation key (714) on a keyboard (712) of the mobile device A (704). The activation key (714) may be, for instance, "0." The activation input begins a recording period (716) of the target user (702).

Once the recording period begins, everything the target user (702) says or messages in the phone call is recorded. The target user (702) may write and send a message (718) (e.g. SMS, MMS) (720) including identity information of a third party to the identifying user (700). A portion or all of the message (718) sent to the identifying user (700) using mobile device B (706) may contain identity information. For example, the message (718) may contain the following text— "name: Thomas Smith, mobile phone number: 510.123.4567, email: thomas.smith@gmail.com". The message (718) is sent while the phone call is in session.

When the identifying user (700) and/or the target user (702) determines that enough identity information has been captured, the identifying user (700) may submit a deactivation input (722) by pressing a deactivation key (724) on the keyboard (712) of the mobile device A (704). The deactivation key (724) may be distinct from the activation key (714), and may be, for instance, "1." Those skilled in the art will appreciate that the deactivation key (724) may also be the same as the activation key (714). When the deactivation input is received, the recording period of the target user (702) ends (726). After the recording period ends, the target user (702) stops sending messages (728) including identity information to the identifying user (700). Those skilled in the art will appreciate that there may be various other ways by which identity information of a third party is obtained.

Figure 8:
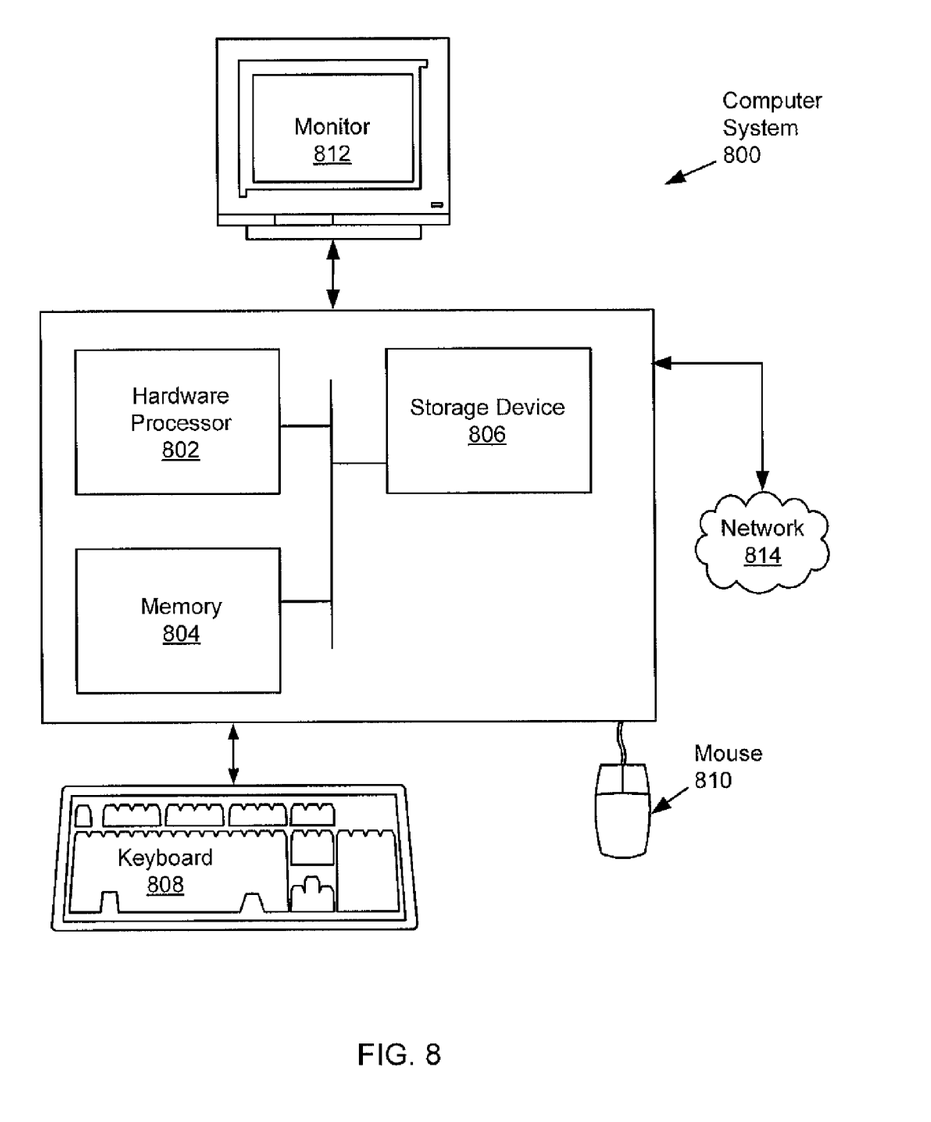
FIG. 8 shows a computer system in accordance with one or more embodiments of the invention.

Embodiments of the invention may be implemented on virtually any type of computer regardless of the platform being used. For example, as shown in FIG. 8, a computer system (800) includes one or more processor(s) (802), associated memory (804) (e.g. random access memory (RAM), cache memory, flash memory, etc.), a storage device (806) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (802) is hardware. For example, the processor may be an integrated circuit. The computer system (800) may also include input means, such as a keyboard (808), a mouse (810), or a microphone (not shown). Further, the computer system (800) may include output means, such as a monitor (812) (e.g. a liquid crystal display (LCD), a plasma display, or cathode ray tube (CRT) monitor). The computer system (800) may be connected to a network (814) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (800) includes at least the minimal processing, input, and/or output means necessary to practice embodiments of the invention.

Further, in one or more embodiments of the invention, one or more elements of the aforementioned computer system (800) may be located at a remote location and connected to the other elements over a network. Further, embodiments of the invention may be implemented on a distributed system having a plurality of nodes, where each portion of the invention (e.g. activation input engine, recording initiation engine, deactivation input engine, recording conclusion engine, recording storage engine, parsing engine, contact query engine, existing contact engine, contact creation engine, transmission engine, approval engine, contact storage engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for capturing identity information on a voice call, comprising:
   determining that a phone call is in session on a mobile device of an identifying user, wherein the voice call is conducted between the identifying user and a target user, wherein the identifying user obtains the identity information, and
   wherein the target user provides the identity information;
   receiving, using the mobile device, an activation input from the target user;
   initiating, in response to the activation input, an audio recording of the target user on the phone call;
   recording a voice of the target user in the audio recording;
   receiving, using the mobile device, a deactivation input from the target user;
   concluding, in response to the deactivation input, the audio recording of the target user on the phone call;
   storing the audio recording of the target user;
   converting the audio recording into an audio recording text;
   parsing the audio recording text to generate the identity information of a third party;
   creating, for the third party, a contact comprising the identity information in the mobile device; and
   storing the contact in the mobile device.

2. The method of claim 1, further comprising:
   determining that the contact exists in a data repository;
   modifying the contact by adding the identity information of the third party to the contact to generate a modified contact;
   transmitting the modified contact to the mobile device; and
   storing the modified contact on the mobile device.

3. The method of claim 1, further comprising:
   receiving, from the identifying user, an approval of the modified contact before storing the modified contact on the mobile device.

4. The method of claim 1, further comprising:
   receiving, from the mobile device, a first indication that the identifying user has pressed an activation key on the mobile device, wherein the activation input is the first indication; and
   receiving, from the mobile device, a second indication that the identifying user has pressed a deactivation key on the mobile device, wherein the deactivation input is the second indication.

5. The method of claim 1, further comprising:
   receiving, from the mobile device, a first indication that the identifying user has spoken an activation keyword into a microphone of the mobile device, wherein the activation input is the first indication; and
   receiving, from the mobile device, a second indication that the identifying user has spoken a deactivation keyword into the microphone of the mobile device, wherein the deactivation input is the second indication.

6. The method of claim 1, further comprising:
   initiating, in response to the activation input, a recording period of the target user on the phone call;
   receiving, from the target user, a message comprising the identity information;
   receiving, using the mobile device, the deactivation input;
   concluding, in response to the deactivation input, the recording period of the target user on the phone call;
   storing the message received from the target user;
   parsing the message to generate additional identity information of the third party;
   modifying, for the third party, the contact to generate a modified contact comprising the additional identity information in the mobile device; and
   storing the modified contact in the mobile device.

7. The method of claim 1, wherein the identity information comprises at least one selected from a group consisting of a first name of the third party, a middle name of the third party, a last name of the third party, a mobile phone number of the third party, a work phone number of the third party, an email of the third party, a work address of the third party, a home address of the third party, a website of the third party, a birthday of the third party, a nickname of the third party, a job title of the third party, a department of the third party, a social network handle of the third party, a social network profile of the third party, an instant message name of the third party, and notes associated with the third party.

8. The method of claim 1, wherein:
   the voice call is a voice over IP (VOIP) call.

9. The method of claim 1, further comprising:
   determining that the phone call is disconnected; and
   storing the audio recording of the target user before receiving the deactivation input.

10. The method of claim 1, further comprising:
    transmitting, to the identifying user, a text message requesting an approval.

11. The method of claim 1, further comprising:
    emailing the identifying user indicating that the contact has been stored in the mobile device.

12. A system for capturing identity information on a voice call, comprising:
    a processor; and
    a contact identification application executing on the processor and configured to:
       determine that a phone call is in session on a mobile device of an identifying user,
          wherein the voice call is conducted between the identifying user and a target user,
             wherein the identifying user obtains the identity information, and wherein the target user provides the identity information;
receive, using the mobile device, an activation input from the target user;
initiate, in response to the activation input, an audio recording of the target user on the phone call;
record a voice of the target user in the audio recording;
receive, using the mobile device, a deactivation input from the target user;
conclude, in response to the deactivation input, the audio recording of the target user on the phone call;
store the audio recording of the target user;
convert the audio recording into an audio recording text;
parse the audio recording text to generate the identity information of a third party;
create, for the third party, a contact comprising the identity information in the mobile device; and
store the contact in the mobile device.

13. The system of claim 12, wherein the contact identification application is further configured to:
determine that the contact exists in a data repository;
modify the contact by adding the identity information of the third party to the contact to generate a modified contact;
transmit the modified contact to the mobile device; and
store the modified contact on the mobile device.

14. The system of claim 12, wherein the contact identification application is further configured to:
receive, from the mobile device, a first indication that the identifying user has pressed an activation key on the mobile device, wherein the activation input is the first indication; and
receive, from the mobile device, a second indication that the identifying user has pressed a deactivation key on the mobile device, wherein the deactivation input is the second indication.

15. A non-transitory computer readable storage medium storing instructions for capturing identity information on a voice call, the instructions executable on a processor and comprising functionality for:
determining that a phone call is in session on a mobile device of an identifying user,
wherein the voice call is conducted between the identifying user and a target user,
wherein the identifying user obtains the identity information, and
wherein the target user provides the identity information;
receiving, using the mobile device, an activation input from the target user;
initiating, in response to the activation input, an audio recording of the target user on the phone call;
recording a voice of the target user in the audio recording;
receiving, using the mobile device, a deactivation input from the target user;
concluding, in response to the deactivation input, the audio recording of the target user on the phone call;
storing the audio recording of the target user;
converting the audio recording into an audio recording text;
parsing the audio recording text to generate the identity information of a third party;
creating, for the third party, a contact comprising the identity information in the mobile device; and
storing the contact in the mobile device.

16. The non-transitory computer readable storage medium of claim 15, the instructions further comprising functionality for:
determining that the contact exists in a data repository;
modifying the contact by adding the identity information of the third party to the contact to generate a modified contact;
transmitting the modified contact to the mobile device; and
storing the modified contact on the mobile device.

17. The non-transitory computer readable storage medium of claim 15, the instructions further comprising functionality for:
receiving, from the mobile device, a first indication that the identifying user has spoken an activation keyword into a microphone of the mobile device, wherein the activation input is the first indication; and
receiving, from the mobile device, a second indication that the identifying user has spoken a deactivation keyword into the microphone of the mobile device, wherein the deactivation input is the second indication.

18. The non-transitory computer readable storage medium of claim 15, wherein the identity information comprises at least one selected from a group consisting of a first name of the third party, a middle name of the third party, a last name of the third party, a mobile phone number of the third party, a work phone number of the third party, an email of the third party, a work address of the third party, a home address of the third party, a website of the third party, a birthday of the third party, a nickname of the third party, a job title of the third party, a department of the third party, a social network handle of the third party, a social network profile of the third party, an instant message name of the third party, and notes associated with the third party.

* * * * *